(12) United States Patent
Malgeri

(10) Patent No.: US 11,958,441 B2
(45) Date of Patent: *Apr. 16, 2024

(54) LATERALLY EXTENSIBLE ACCESSIBLE VEHICLE CARGO RACK

(71) Applicant: Noah Malgeri, Las Vegas, NV (US)

(72) Inventor: Noah Malgeri, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,864

(22) Filed: Aug. 15, 2022

(65) Prior Publication Data

US 2023/0182649 A1     Jun. 15, 2023

Related U.S. Application Data

(63) Continuation of application No. 16/546,800, filed on Aug. 21, 2019, now Pat. No. 11,447,074.

(60) Provisional application No. 62/720,448, filed on Aug. 21, 2018.

(51) Int. Cl.
*B60R 9/052*     (2006.01)
*B60R 9/048*     (2006.01)

(52) U.S. Cl.
CPC .............. *B60R 9/052* (2013.01); *B60R 9/048* (2013.01)

(58) Field of Classification Search
CPC ........... B60R 9/04; B60R 9/042; B60R 9/045; B60R 9/048; B60R 9/052
USPC ....................................................... 224/315
See application file for complete search history.

(56) References Cited

U.S. PATENT DOCUMENTS

| | | | |
|---|---|---|---|
| 3,963,136 A | 6/1976 | Spanke | |
| 4,081,095 A * | 3/1978 | Wilburn | B60R 9/042 414/522 |
| 4,446,998 A * | 5/1984 | Taig | B60R 9/042 224/310 |
| 5,544,796 A * | 8/1996 | Dubach | B60R 9/042 224/310 |
| 5,782,391 A | 7/1998 | Cretcher | |
| 6,158,638 A | 12/2000 | Szigeti | |
| 6,679,407 B2 * | 1/2004 | Weeks | B60R 9/042 224/310 |
| 7,011,239 B2 * | 3/2006 | Williams | B60R 9/042 224/310 |
| 8,267,292 B2 | 9/2012 | Czornyj | |
| 9,193,305 B2 * | 11/2015 | Kramer | B60R 9/042 |
| 9,457,727 B2 * | 10/2016 | Hobbs | B60R 9/06 |
| 9,821,719 B2 * | 11/2017 | Espig | B60R 9/042 |
| 10,040,402 B1 | 8/2018 | Brusselback | |
| 10,189,417 B1 * | 1/2019 | Morken | B60R 9/042 |
| 10,246,025 B1 * | 4/2019 | Knigge | B60R 9/042 |
| 10,800,339 B2 | 10/2020 | Anderson | |
| 11,447,074 B2 | 9/2022 | Malgeri | |
| 2003/0052145 A1 * | 3/2003 | Aftanas | B60R 9/042 224/310 |
| 2004/0028510 A1 | 2/2004 | Jones | |
| 2005/0017037 A1 | 1/2005 | Aftanas et al. | |
| 2017/0028930 A1 | 2/2017 | Connors | |

(Continued)

*Primary Examiner* — Peter N Helvey
(74) *Attorney, Agent, or Firm* — Levine Bagade Han LLP

(57) ABSTRACT

A vehicle roof rack system is disclosed, such as a laterally extensible rail-type rack for connection to the roof or top of a vehicle. The rack rails may extend laterally and at the same time, through or over their range of extension, come down to a more accessible or lower height with respect to the ground upon which the user is standing or located with respect to the vehicle when using the rack to load or unload cargo.

20 Claims, 17 Drawing Sheets

(56) References Cited

U.S. PATENT DOCUMENTS

| | | |
|---|---|---|
| 2017/0341590 A1 | 11/2017 | McLauchlan |
| 2019/0126838 A1* | 5/2019 | Harrell .................... B60R 9/042 |
| 2021/0039560 A1 | 2/2021 | Malgeri |
| 2021/0138966 A1 | 5/2021 | Daniels et al. |
| 2021/0261065 A9 | 8/2021 | Malgeri |

* cited by examiner

LATERALLY EXTENSIBLE ACCESSIBLE VEHICLE CARGO RACK

CROSS-REFERENCE TO RELATED APPLICATIONS

This application is a continuation of U.S. application Ser. No. 16/546,800, filed Aug. 21, 2019, which claims priority to U.S. Provisional Application No. 62/720,448, filed Aug. 21, 2018, both of which are incorporated herein by reference in their entireties.

TECHNICAL FIELD

This patent discloses and claims a roof rack solution that overcomes the primary shortcoming associated with conventional roof rack systems: trouble reach the load area to confidently, safely and reliably secure awkward and bulky cargo (such as a bike) on top of a tall vehicle, such as an SUV. Roof racks are an immensely popular way to transport bulky or messy cargo such as recreational equipment: bikes, surfboards, standup paddle boards, snowboards, skis, kayaks, tubes and other water toys, cargo boxes, etc.

BACKGROUND

As more people switch to taller SUVs and crossovers, loading equipment can become a real safety issue.

How to successfully and reliably secure your bike, board, or cargo to your roof rack without injuring yourself, your vehicle or your equipment, but the vehicle is too high! This problem is a chore and creates a lot of anxiety. That's because it can be dangerous. Also, if you mess it up, you risk the load jettisoning off on the highway, potentially causing an accident and definite liability. That will ruin your weekend biking trip for sure.

Conventional roof racks are too high; even unreachable—creates "load anxiety." Cargo or equipment is too heavy to hoist up and secure and to remove without fear or danger of dropping it, injuring someone or damaging the equipment, vehicle or nearby vehicles. This problem is more common as SUVs become dominant. Dangerous as loads are not properly secured, creates anxiety and potential liability or injury. Struggling with loading/unloading takes valuable time away from fun and/or travel. Limits recreation option for some people—need to depend on another person to come along to assist. All of the foregoing dissuades people from taking part in the activities they love.

One problem with the conventional, known designs is that as mounted on a vehicle, they are too high from the ground to allow the user to comfortably and safely emplace (mount) and remove his or her Cargo. This creates many issues; for example, Cargo is sometimes left insecurely mounted on the vehicle, increasing the possibility that the Cargo would fall off or dislodge from the rack and vehicle during travel, creating a hazard for accidents and injury as well as potentially damaging or even destroying the Cargo. Another problem created by existing designs is that heavier Cargos cannot be reliably or comfortably mounted or dismounted by users of smaller weaker stature, the older or folks with certain disabilities. This is an enormous limitation on users who would otherwise like to be able to enjoy the outdoors and their preferred outdoor activities without the worry or anxiety of "rack anxiety" caused by the fear of not being able, for example, after a day of heavy exertion, of remounting the Cargo comfortably or safely without help. This is especially true as more and more folks choose sport utility vehicles or "SUV" with which to enjoy their outdoor sport or recreational activities, as such vehicles are often taller or higher off the ground than typical, traditional sedan or coupe or station wagon vehicles used commonly in past times.

Conventional workarounds to the problem are inadequate. People resort to using stools, ladders, etc. Attempting to stand out of the sunroof, standing on the doorsill through an open door, sprawling on the hood, standing on the car. These techniques result in vehicle damage: denting, scratching with shoes and zippers and generally getting yourself dirty. Also, it can result in nasty falls that can sideline you for the day, or even season.

DETAILED DESCRIPTION

Figure 1:
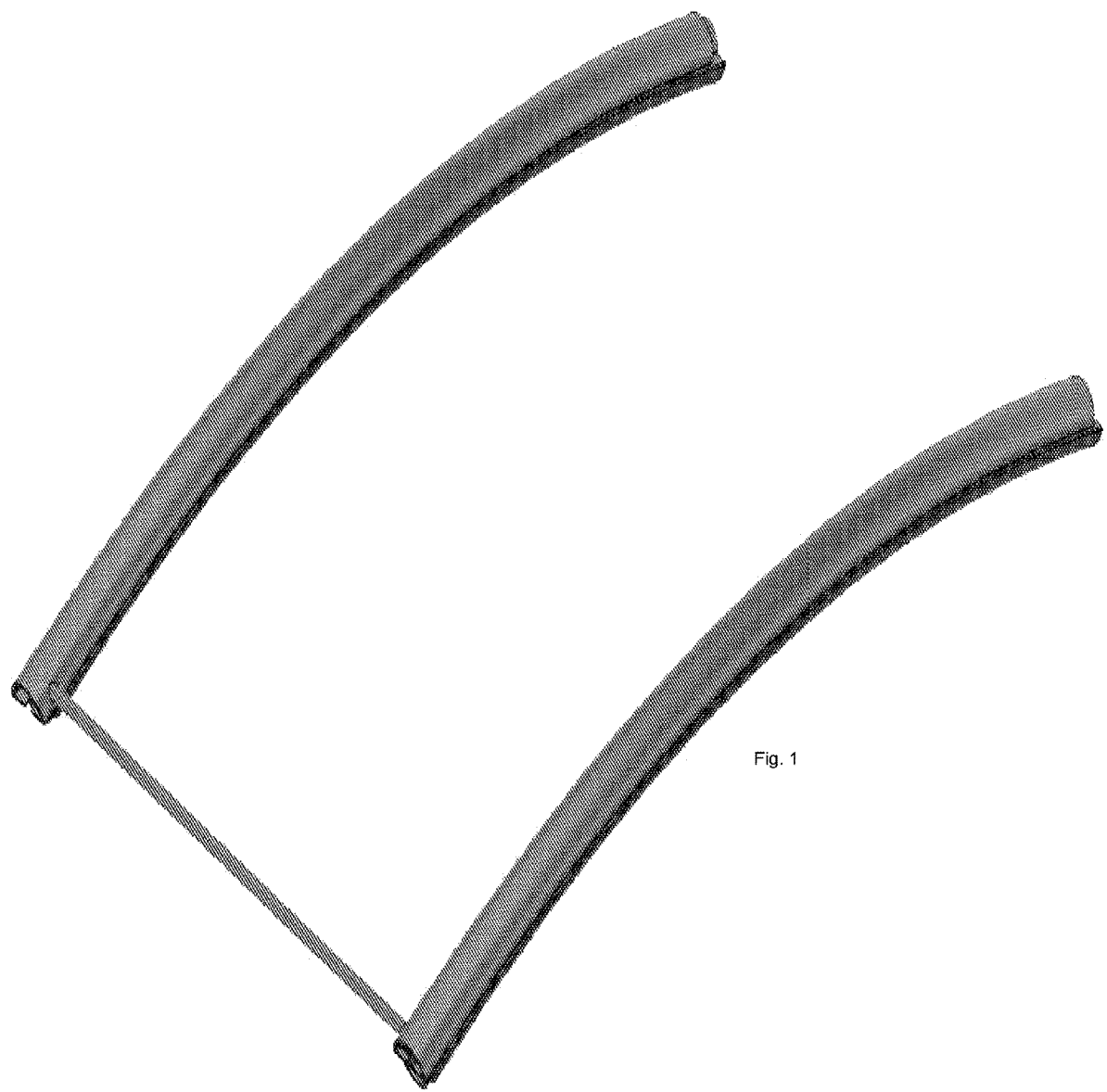
FIG. 1 is an oblique view of an embodiment of the present invention in a stowed configuration.

The disclosed and claimed invention is a vehicle roof rack system, also referred to herein as a cargo rack or roof rack, or simply "rack," which is an improvement to the common automobile roof rack normally used to transport bikes, surfboards, snowboards, cargo boxes, stand up paddleboards, kayaks, bodyboards and ad manner of outdoor recreational equipment ("Cargo"). The invention is a laterally (in relation to the vehicle upon which it is mounted) extensible rail-type rack for connection to the roof or top of a vehicle, such as the roof, the top of a pickup cap, or the top of a camper, RV, or other vehicle. The rack rails may extend laterally in the inventive rack, and at the same time, through or over their rang of extension, come down to a more accessible or lower height with respect to the ground upon which the user is standing or located with respect to the vehicle when using the rack to load or unload Cargo.

Cargo in some embodiments of the invention can be affixed to the rack system by the use of a cargo mounting adaptor which can preferably be adapted to be securely and conveniently affixed to the cargo of choice, such as are known in the art, such as ski holders, snowboard holders, kayak holders, cargo boxes, cargo cages, ladder holders, and others. The cargo mounting adaptor can be affixed securely to the rail assemblies using known means of affixation such as screws, clamps, rubber or polymer straps, string, wire, rope, bolts and nuts, magnets, or other affixation means as are known in the vehicle roof rack arts.

Rails may be equipped with travel limiters which may be set to limit relative rail travel in order to prevent any rail to vehicle contact at any point or the extreme extent of the rail travel. Such travel limiters may be adjustable and lockable. The tips or ends of the rails may be equipped with non-marring bumpers or otherwise softened or rounded in order to mitigate any latent risk of injury or damage from contact between a Rail and another object, such as a person, pet, equipment, Cargo, or the vehicle upon which the Rack is mounted or any component thereof.

The Rails may be interconnected using interconnection apparatus such as axle-mounted wheels riding within a corresponding channel on the adjacent Rail. The wheels may be geared or smooth. The bearings of the wheels may be dampened, tor example using dampening apparatus, or be configured with high relative friction in order to dampen and slow the movement of the Rails with respect to each other. Geared wheels may be engaged to geared racks mounted within the valleys of the channels.

Rails may be three dimensionally printed polymer, milled or machined low density metal such as aluminum, ferrous metal, stampings, extrusions, castings, forgings, or any other manufacture of any other structural material.

One construction involves multiple, for example three, parallel adjacent mounted rails, with one rail being elevated some distance, such as ⅜, above the tallest point of any adjacent rail, such that the Raised Rail can support Cargo without the Cargo touching any other Rail.

Rails can also be interconnected with one or more lift-assisters, such as extension or compression springs, geared or ungeared torsion bars, compressible fluids such as gases, gas and piston springs, gas springs, pulleys or geared springs or leaf springs, all damped or undamped. In use, such lift assisted Rails can be pulled down and locked down or relatively down, the Cargo loaded onto, and then the rails can be lift assisted to lift the Cargo back up onto the roof or to provide lift assistance to the user during such lift.

The Rails can also be telescoping, either tubular of differing outer and inner diameters to allow the rails to ride within each other, with any cross-sectional shape such as rectilinear, triangular, oval, round or polygonal, or any combination thereof. Rails can also ride adjacent to each other without being contained either fully or partially within each other, or some combination of both.

Interconnection apparatus can also be in some embodiments, bushings, ball, pin, or other roller bearing, any combinations of bushings and other bearings, or other bearings as are known in the art. Rails can be adjoined in sets of two, three, four, or any other number to facilitate telescoping. One Rail should preferably be raised above the elevation of the other and/or adjoining rails so that the one raised Rail can be the load bearing Rail. The load bearing rail can be equipped to bear the load of the Cargo. The load bearing rail should preferable be the or among the rail or rails that rides the lowest during deployment to present the greatest convenience to the user in mounting and dismounting Cargo.

The Raised Rail or load bearing rail can, for example, be topped with a load bearing surface, such as a rubber or polymer strip, to prevent and/or reduce an y marring by Cargo of the Rails or vice versa, and to help secure the Cargo effectively and reliably atop the Rail.

Rails can be configured in varying radii for various and differing vehicle applications, for example to accommodate vehicles of differing and various overall and roof widths. Towers can be configured in differing and various heights.

Damping of the rail telescoping and/or extending can be performed by dampener apparatus such as damped rollers, rollers with damped bearings, dampening due to friction or viscous couplings. Damping can also be accomplished by gas piston or other fluid piston dampers such as are known in the shock absorption and dampening arts, or through cable actuated rotary dampers that use, for example, cables or coated cables attached to a spool or roller that can be spring loaded and/or dampened.

In addition to dampening, the extensible rails assemblies can include lift assist functionality such as spring lifts or air spring lifts, or other compressible fluid and piston spring lifts. Other lifts can include torsion bars, coil springs, leaf springs or other lift device.

Other configurations can employ a lift assister that is a motorized or engine powered lift assist system, such as an electric motor, that may be, for example, powered by the vehicle electrical system or another electrical power source. In such applications, the motor or engine powered mechanism can also integrate or be in lieu of, a separate damping system or dampening parts or elements.

The lift assister can be really great for users who may lack the strength or stature or merely the preference to hoist their recreational equipment or cargo upon the roof of their vehicle.

The towers can also include logos or other symbols chosen by the user, which symbols could be etched or cut into or through portions of the tower, for example, sheet metal sections of the towers.

The Rails can have an I beam cross section or a T beam or L beam cross section, be enclosed polygon in cross section, be cruciform, rectilinear or comprise another structurally adequate cross section. The Rails can be C channel or boxed.

This invention is of a roof rack system for cars, automobiles, vans, SUVs, or other vehicles. The inventive roof rack has rails that are laterally extensible relative to the vehicle upon which the rack is mounted. Rails may move together in a coordinated fashion either due to being connected or locked together, or due to the extension mechanism coordinating their movement, or they may move independently, or may be made to move independently or in a coordinated fashion, i.e., selectable mode of operation.

Figure 2:
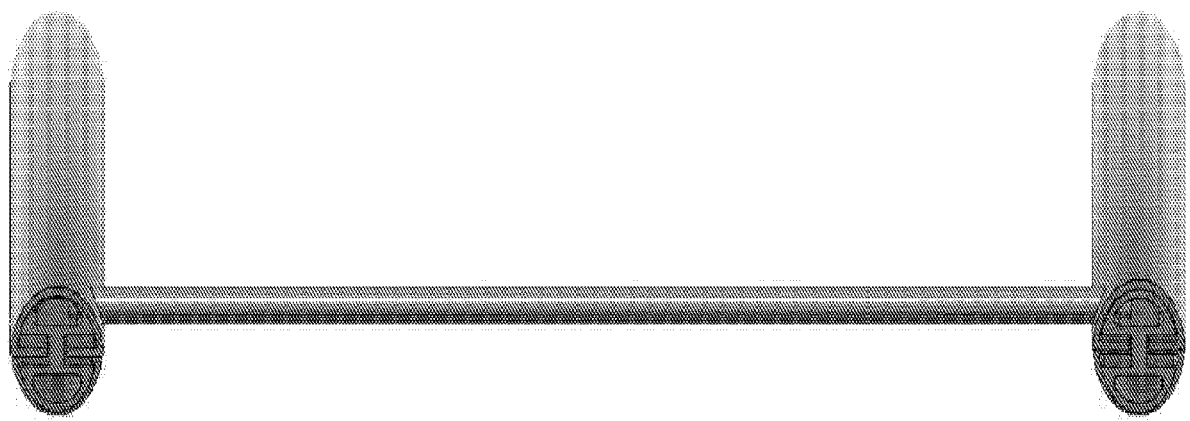
FIG. 2 is a side view of an embodiment of the present invention in a stowed configuration.
Figure 3:
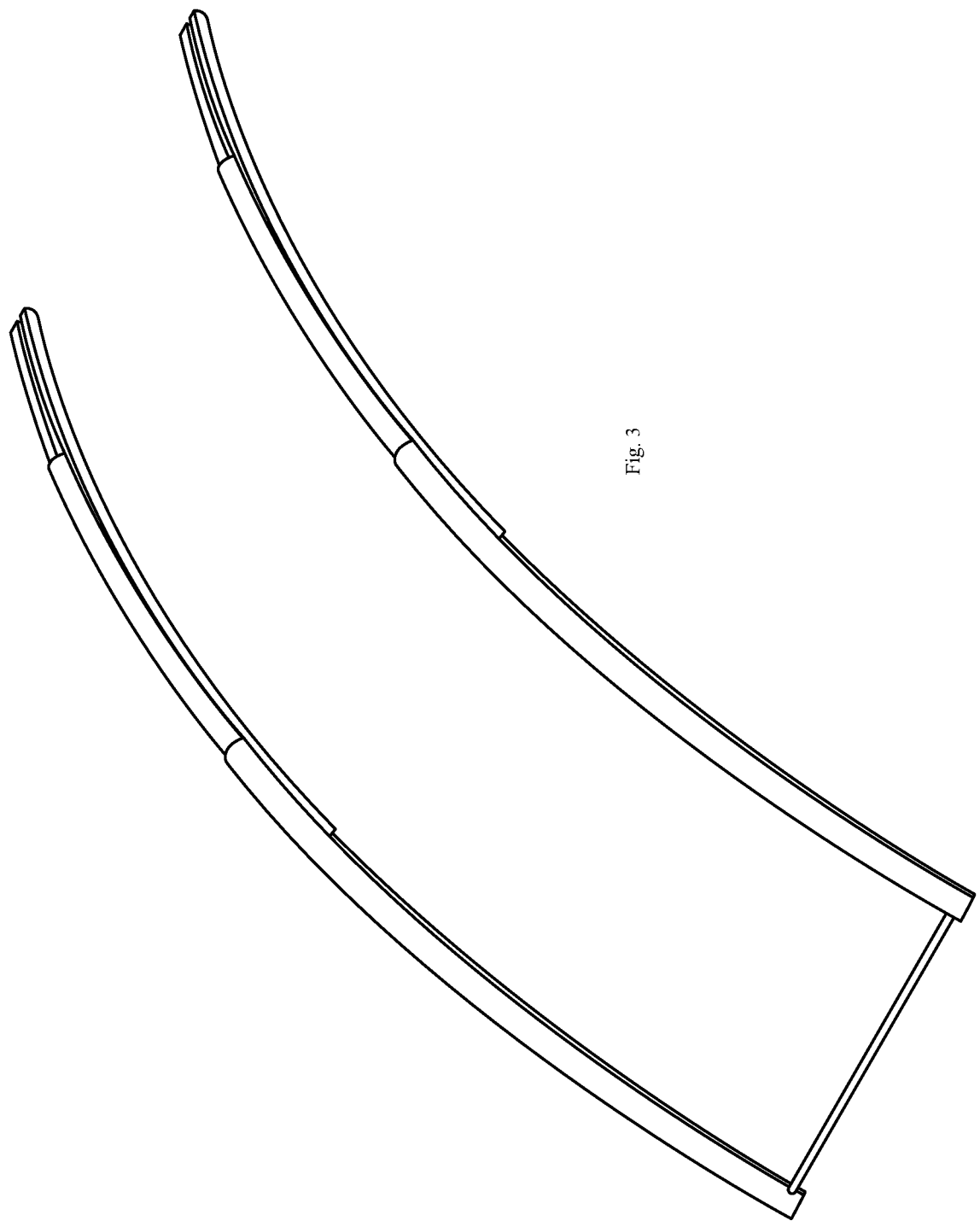
FIG. 3 is an oblique view of an embodiment of the present invention in a extended or deployed configuration.

The inventive rack can in some embodiments extend to over 200% of its stowed length, in other embodiments, it can extend to over 300% of it its stowed length. The extent of extension depends in some embodiments on the number of rails that are present in the rail assembly. For example, in FIG. 3, the inventive embodiment has two rail assemblies each with three separate bowed, interlocking rails that slide relative to each other, allowing for extension. For clarity, as used herein, a "rail assembly" is an arrangement of rails, which together form a rail assembly. One or more rail assemblies configured to be used together on a vehicle form the vehicle roof rack system or roof rack, or rack. FIG. 1 shows the rack of FIG. 3 in a stowed configuration, which means that the rails are slid back together adjacent to each other and whose lengths are arranged co-extensively and approximately conterminously. FIG. 2 shows a side view of the same inventive embodiment of FIGS. 1 and 3. In FIG. 2, visible is the cross-section design of the rail assembly components and how they fit together to provide rigidity, aerodynamicness, and lightness. Other cross sections are possible for the inventive rack rail assemblies and rails, such as cruciform, rectilinear, square, oval, oblong, elliptical, and others. FIG. 2 also depicts a cross bar that connects rail assembly components from the two rail assemblies together, so that they slide at the same time and the same distance, for convenience. Various other cross-rigidity components, which are means of linking multiple rail assembly components together, are possible in other embodiments of the inventive rack, such as guy wires, tension wires, cross bars, and others.

Figure 4:
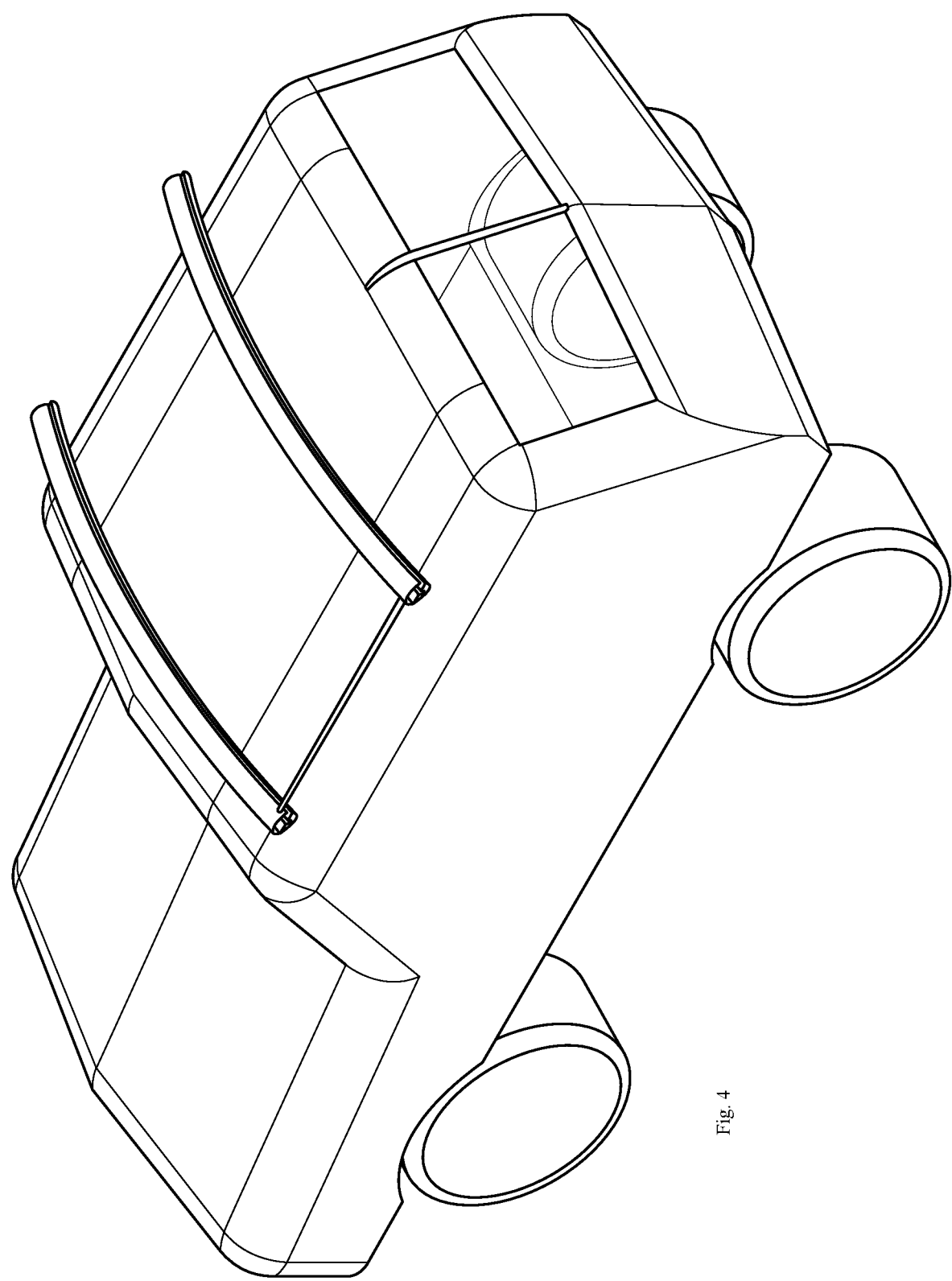
FIG. 4 is an oblique view of an embodiment of the present invention in a stowed configuration, mounted on a vehicle.
Figure 5:
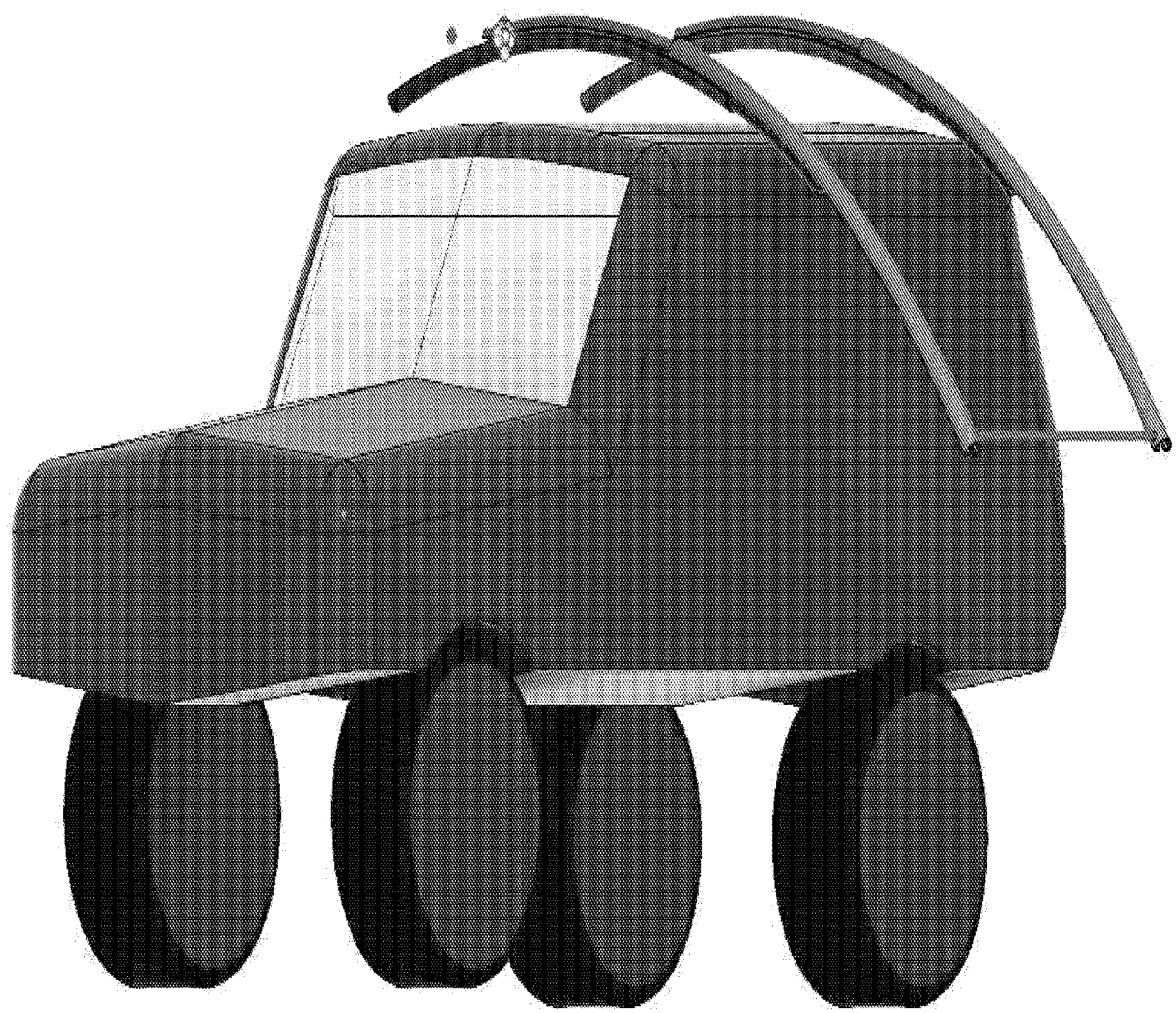
FIG. 5 is a front oblique view of an embodiment of the present invention in a deployed or extended configuration mounted on a vehicle.

FIG. 4 shows an embodiment of the inventive rack mounted on a vehicle, such as an SUV. The inventive rack embodiment is mounted on the roof of the vehicle, in a stowed configuration, such that the rails do not extend excessively beyond the lateral sides of the vehicle. FIG. 5 shows the rack and vehicle of FIG. 4 from another perspective with the inventive rack embodiment extended and deployed. Visible is how the rack load area is brought closer to the ground and is easily accessible by the user. In use, the user could load cargo onto the rack rails in the deployed and extended position, and then slide the loaded rack back up onto the roof with the cargo, very conveniently avoiding dangerous lifting above the user's head. This is very convenient especially for heavy loads and cargo.

Figure 6:
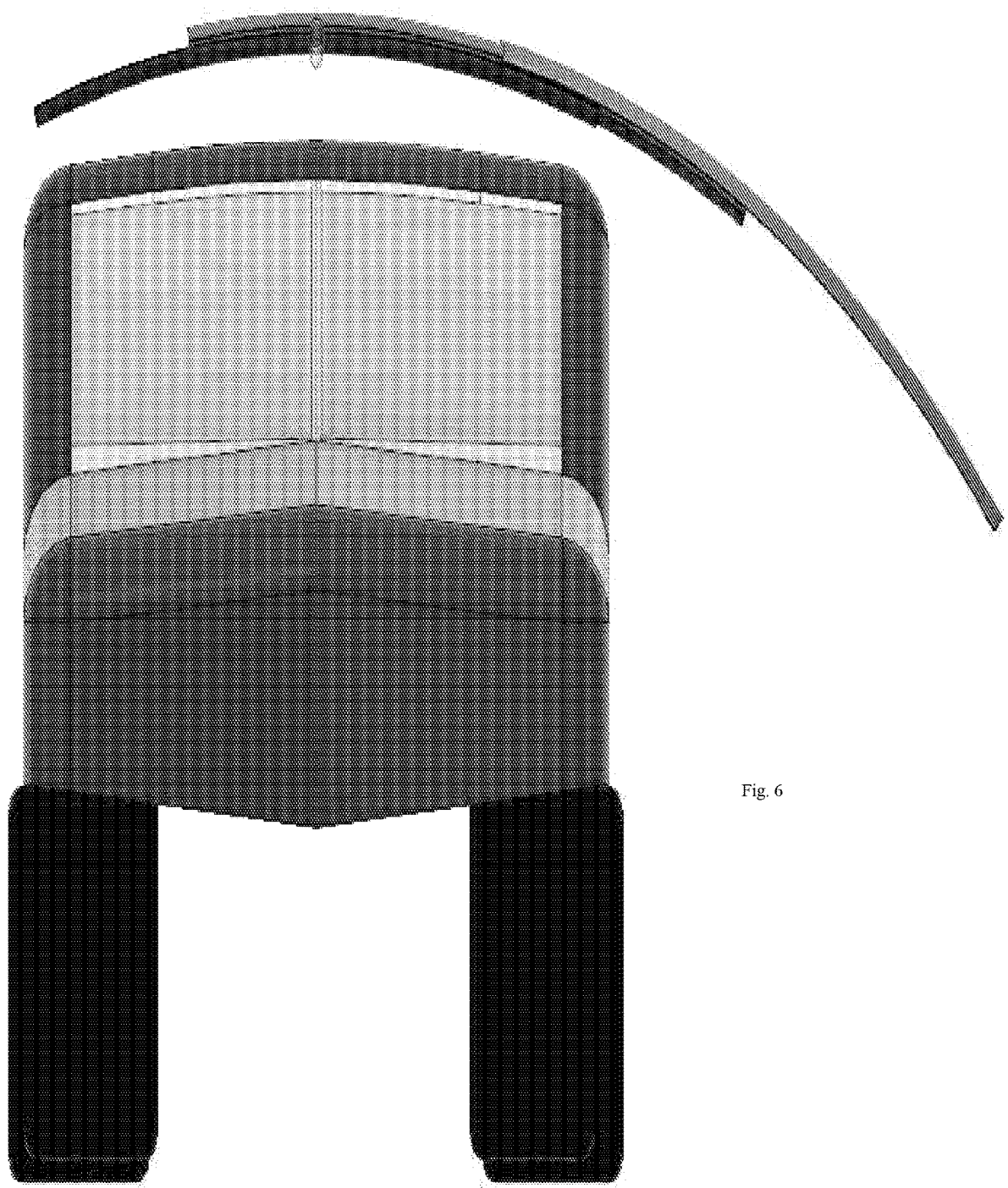
FIG. 6 is a front view of an embodiment of the present invention in a deployed or extended configuration mounted on a vehicle.

FIG. 6 shows a front view of the SUV of FIG. 4, showing the inventive rack mounted on the roof of the SUV and deployed and extended laterally to the side of the SUV, showing how easy it would be to reach the loading area of the rack in the configuration of the inventive rack of FIG. 6, for a user. FIG. 6 shows how the inventive rack can lower the load area and a load or cargo down to a convenient height for a user to reach the load or cargo consistently and safely, without endangering himself or herself, and this will enable the user to ensure that the load is secured fully and securely to the rack so that it will not fall of or get dislodged during driving with the SUV or vehicle, which can avoid cost and injury.

Figure 7:
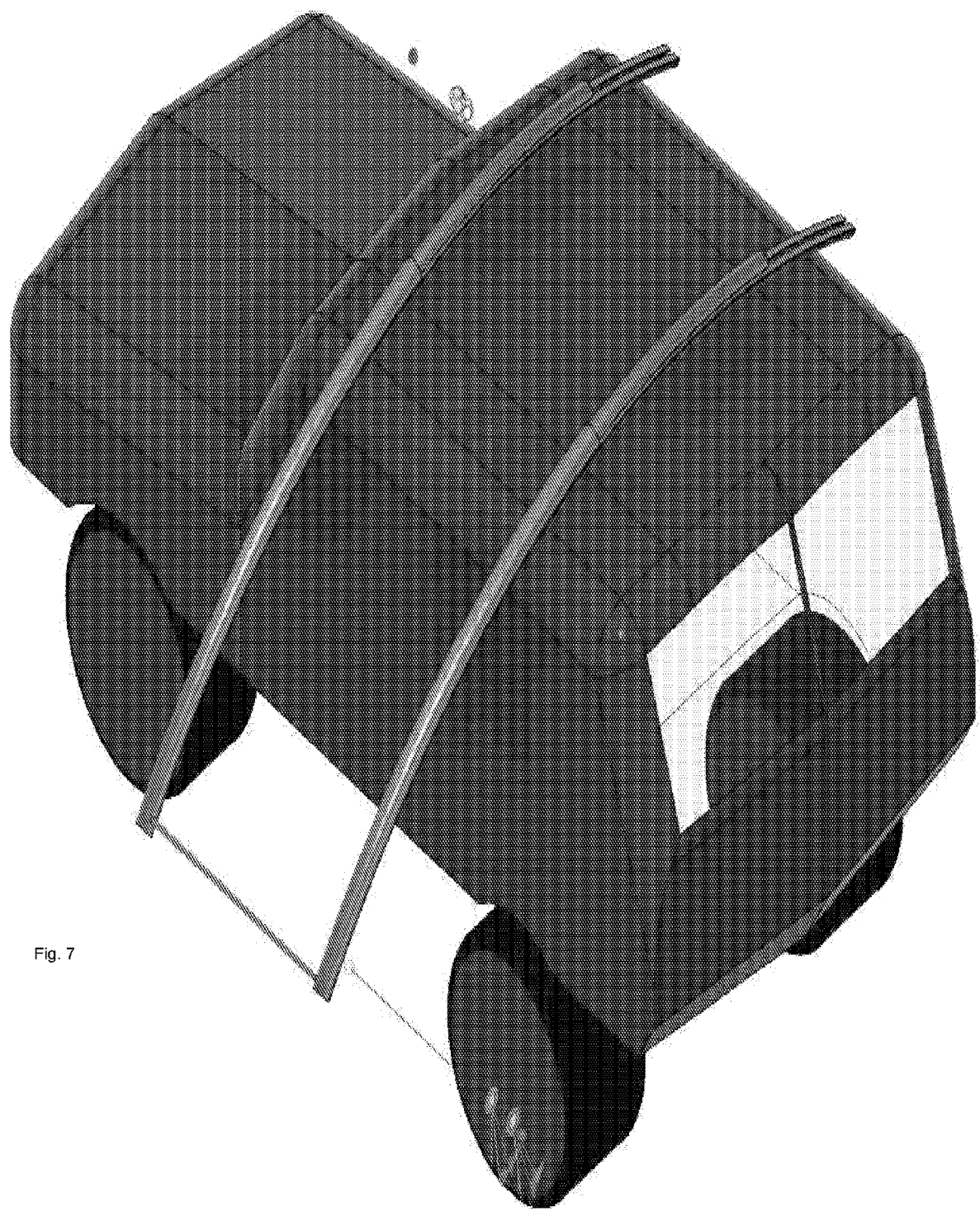
FIG. 7 is a rear oblique view of an embodiment of the present invention in a deployed or extended configuration mounted on a vehicle.
Figure 8:
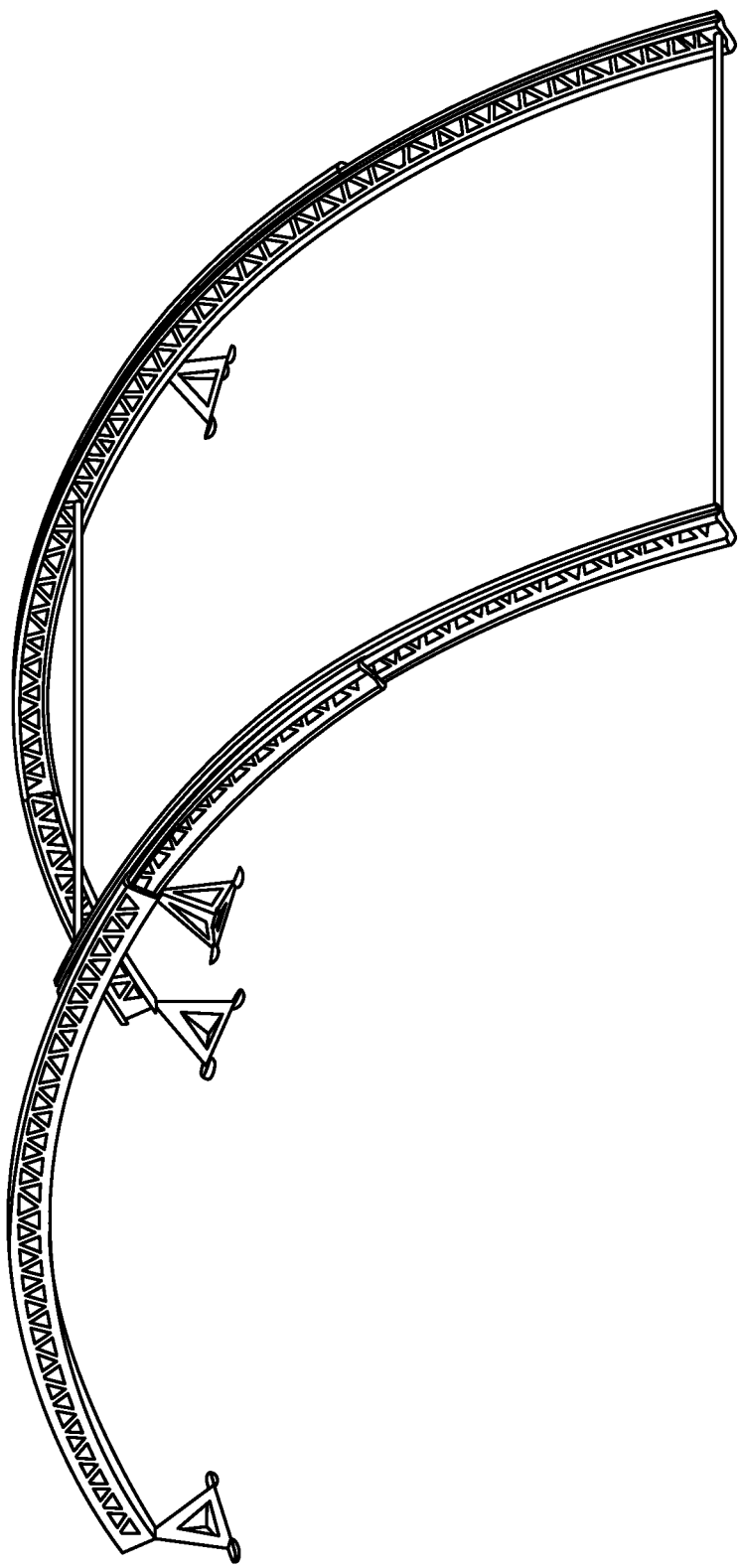
FIG. 8 is a front oblique view of an embodiment of the present invention in an extended or deployed configuration.
Figure 9:
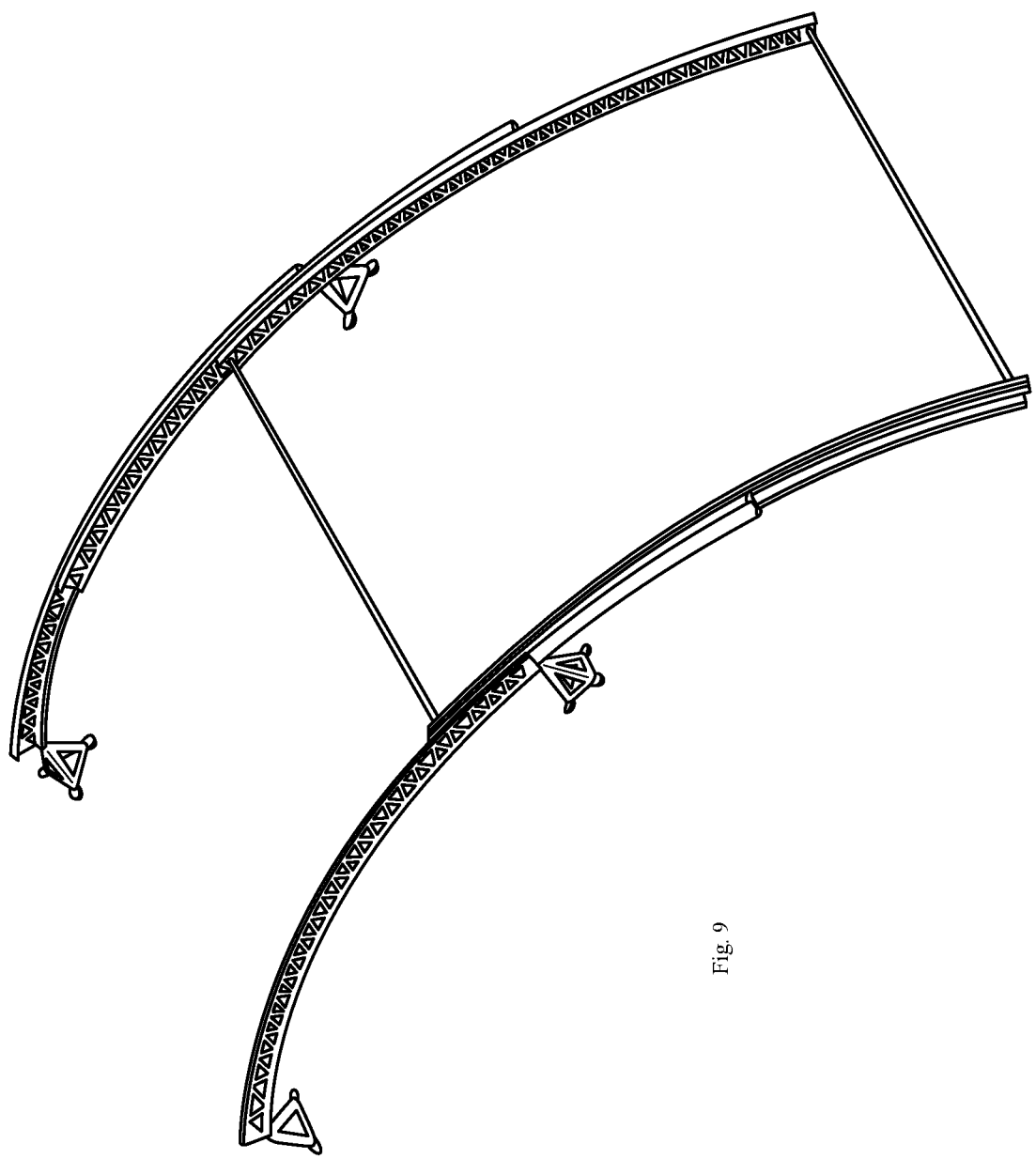
FIG. 9 is a top oblique view of an embodiment of the present invention in an extended or deployed configuration.
Figure 10:
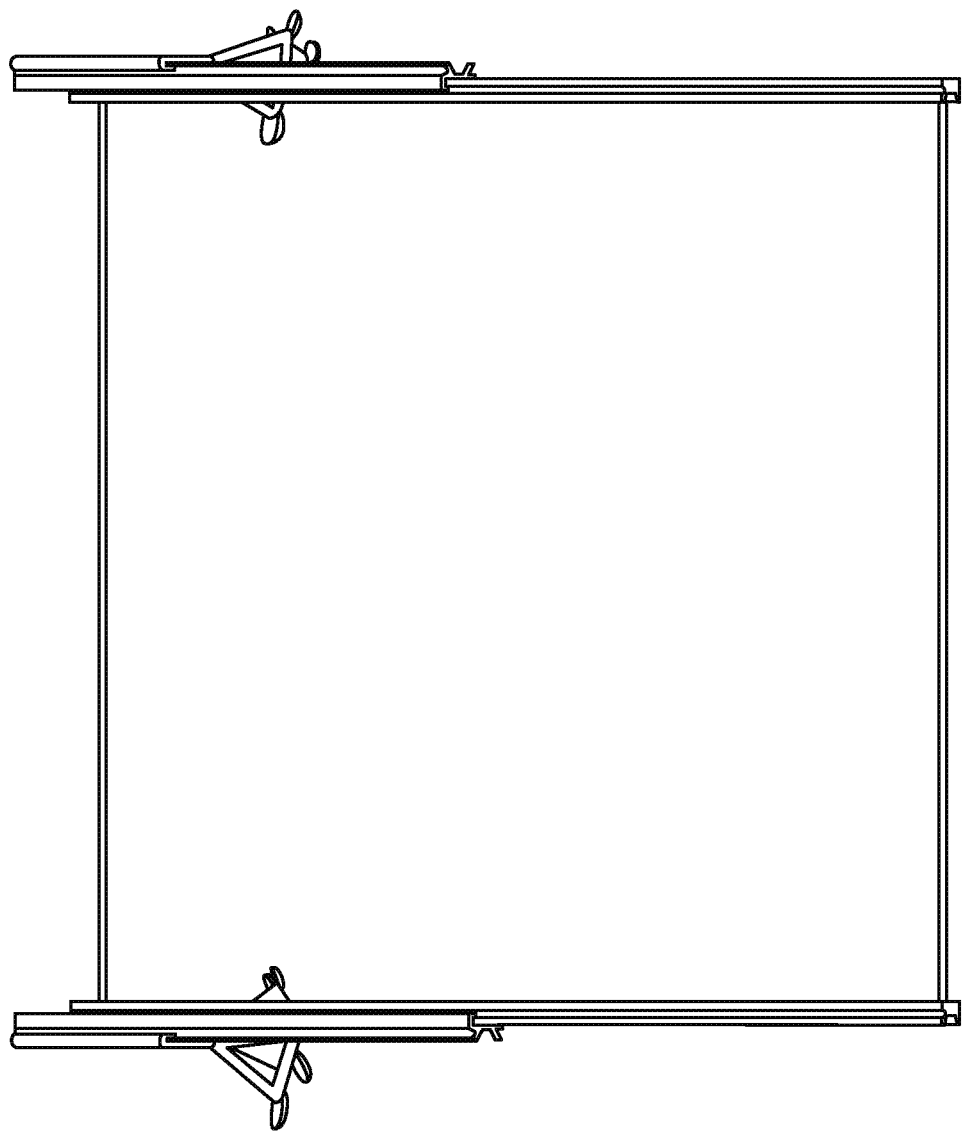
FIG. 10 is a side view of an embodiment of the present invention in an extended or deployed configuration.
Figure 11:
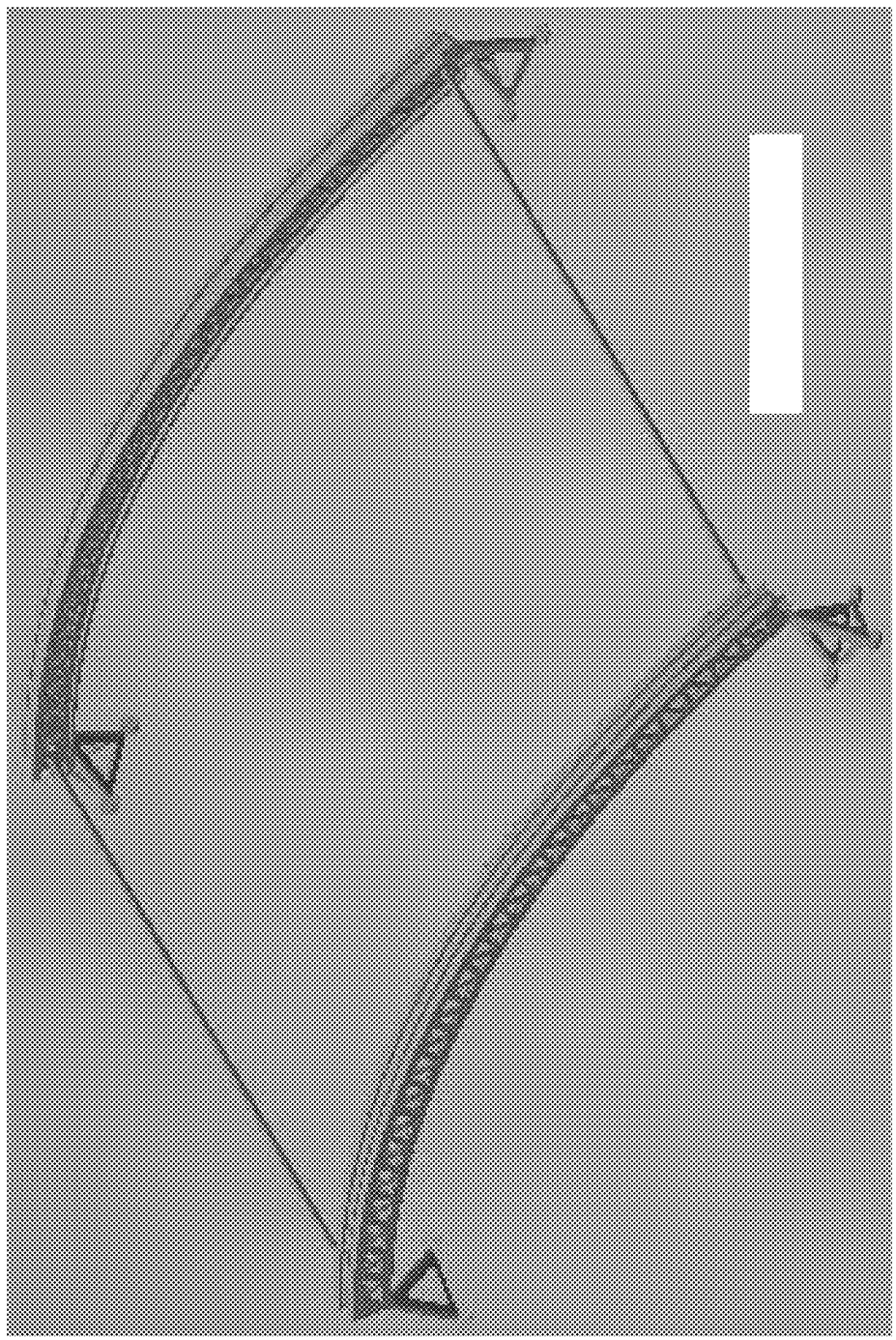
FIG. 11 is a top oblique view of an embodiment of the present invention in a stowed configuration.

FIG. 7 is another view of the SUV and inventive rack of FIG. 6. FIG. 8 shows another embodiment of the inventive rack, again having three rail sections, and having four towers mounted to the underside of the rail assemblies. The towers shown in FIG. 8 can be used as an intermediate connector between the roof rack rail assemblies and the roof of the SUV, connecting the rails to the roof of the vehicle, enabling the rack assemblies to be secured securely to the vehicle, similarly to in conventional roof racks as are well known in the art. FIG. 8 also shows two cross bars linking the rail assemblies on the two rail assemblies together for coordinated movement for convenience or safety or for other reasons. FIG. 9 shows another view of the inventive rack of FIG. 7, showing the four rack towers, the two rail assemblies each having three component rails, and the two cross bars connecting the rails assemblies for coordinated movement. FIG. 10 shows a side view of the inventive roof rack of FIG. 9, in the same deployed and extended configuration. FIG. 10 shows how far the inventive rack can lower the loading area down below the top of the roof of a vehicle, represented by the level of the bottom of the towers. In other embodiments, the inventive rack can lower the loading area and cargo down lower or not as low. FIG. 11 shows the inventive rack embodiment of FIG. 10 in a stowed configuration, showing the three rail components in each of the two rail assemblies all nested and adjacent to each other for compact form during travel. The rail components on some embodiments are lockable using conventional and known securing and locking components to prevent relative movement of the rail components, when, for example, traveling.

Figure 12:
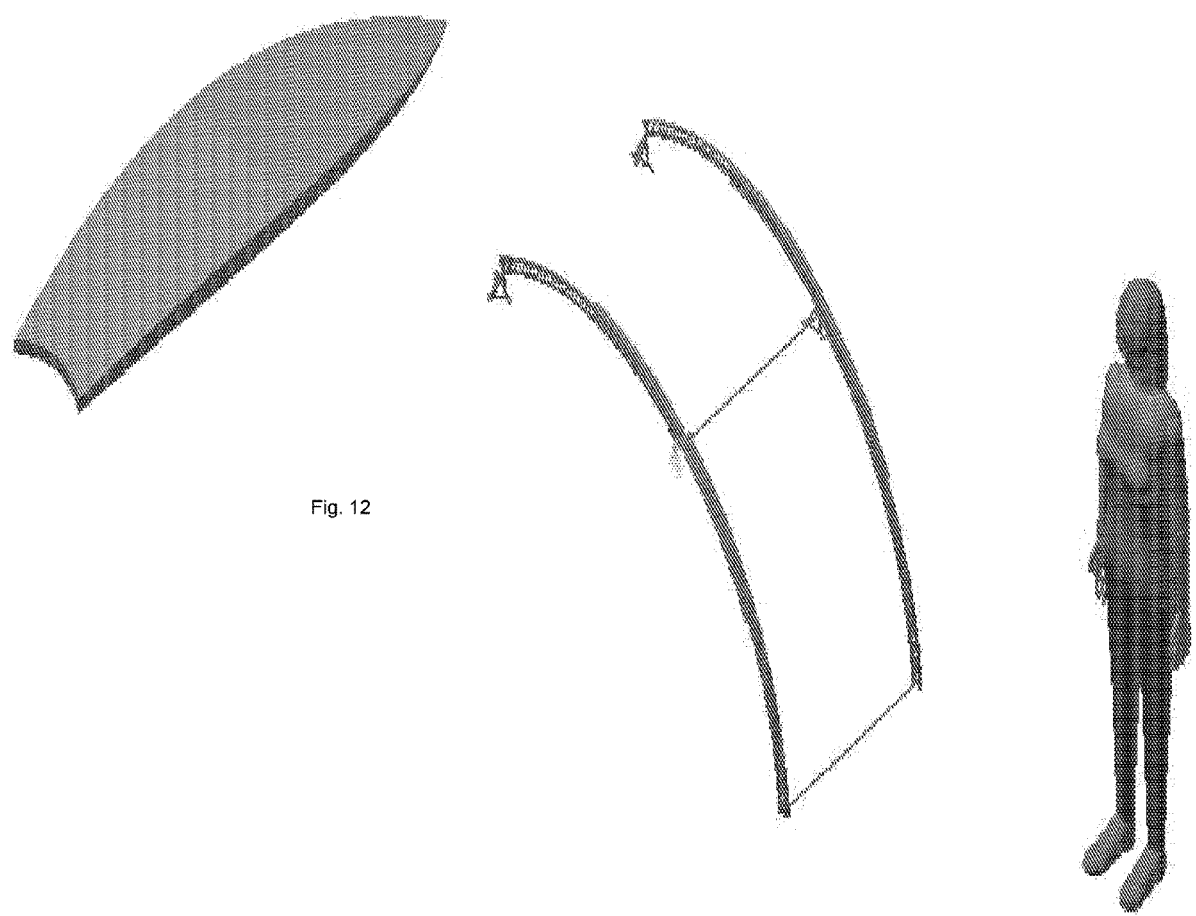
FIG. 12 is an oblique view of an embodiment of the present invention in an extended or deployed configuration adjacent to an adult human standing and a surfboard.

FIG. 12 shows the inventive rack of FIG. 11 alongside a human adult and a surfboard. The rack of FIG. 12 is in its deployed and extended configuration. FIG. 12 illustrates how the inventive rack of FIG. 12 can be deployed to lower the loading area down adjacent to a user standing next to a vehicle upon Which the rack is mounted (not shown for clarity). FIG. 12 shows how the inventive rack can lower the loading area to the upper body height of an adult person to allow for ease of loading.

Figure 13:
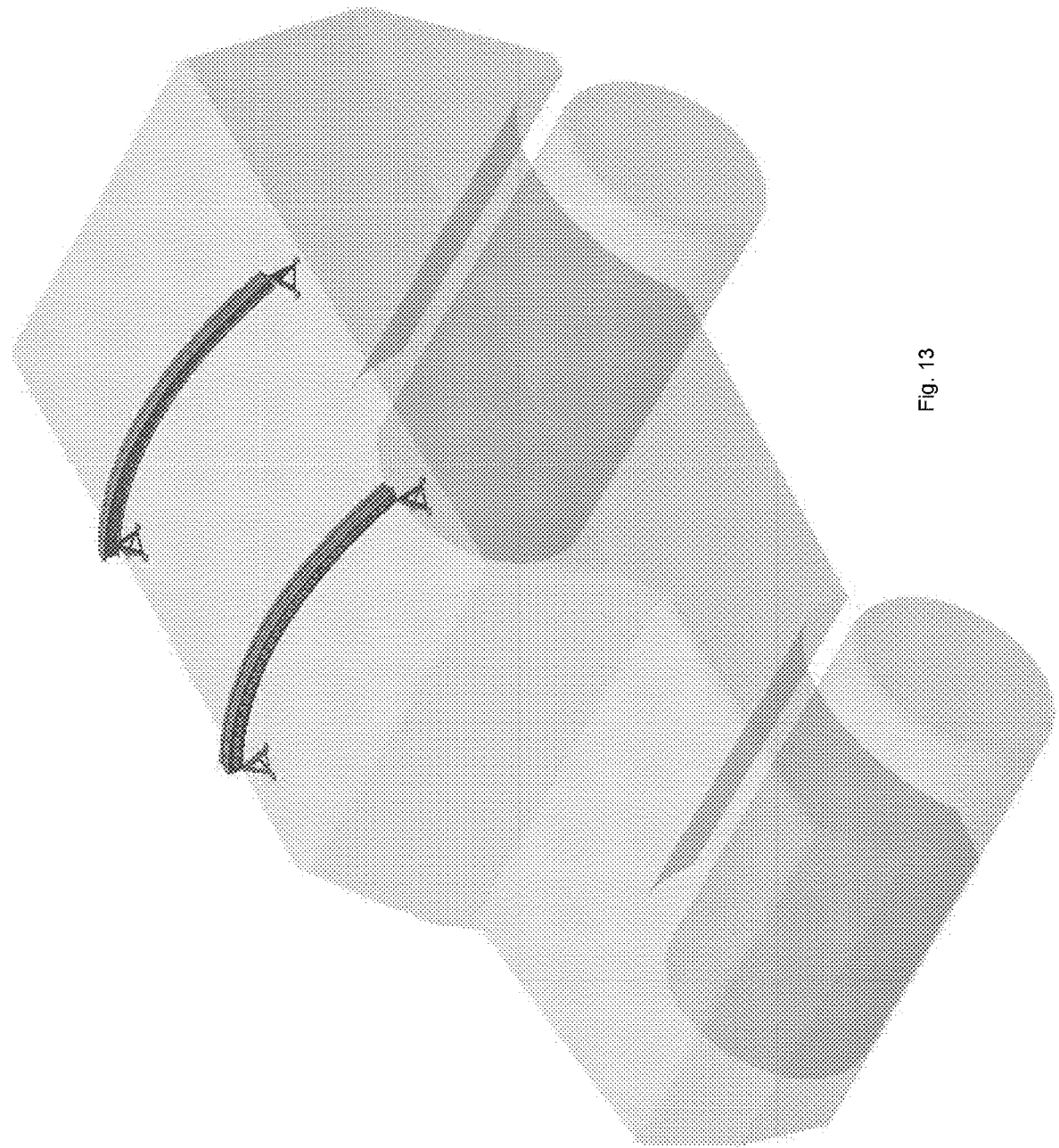
FIG. 13 is an oblique view of an embodiment of the present invention in a stowed configuration, mounted on a vehicle.
Figure 14:
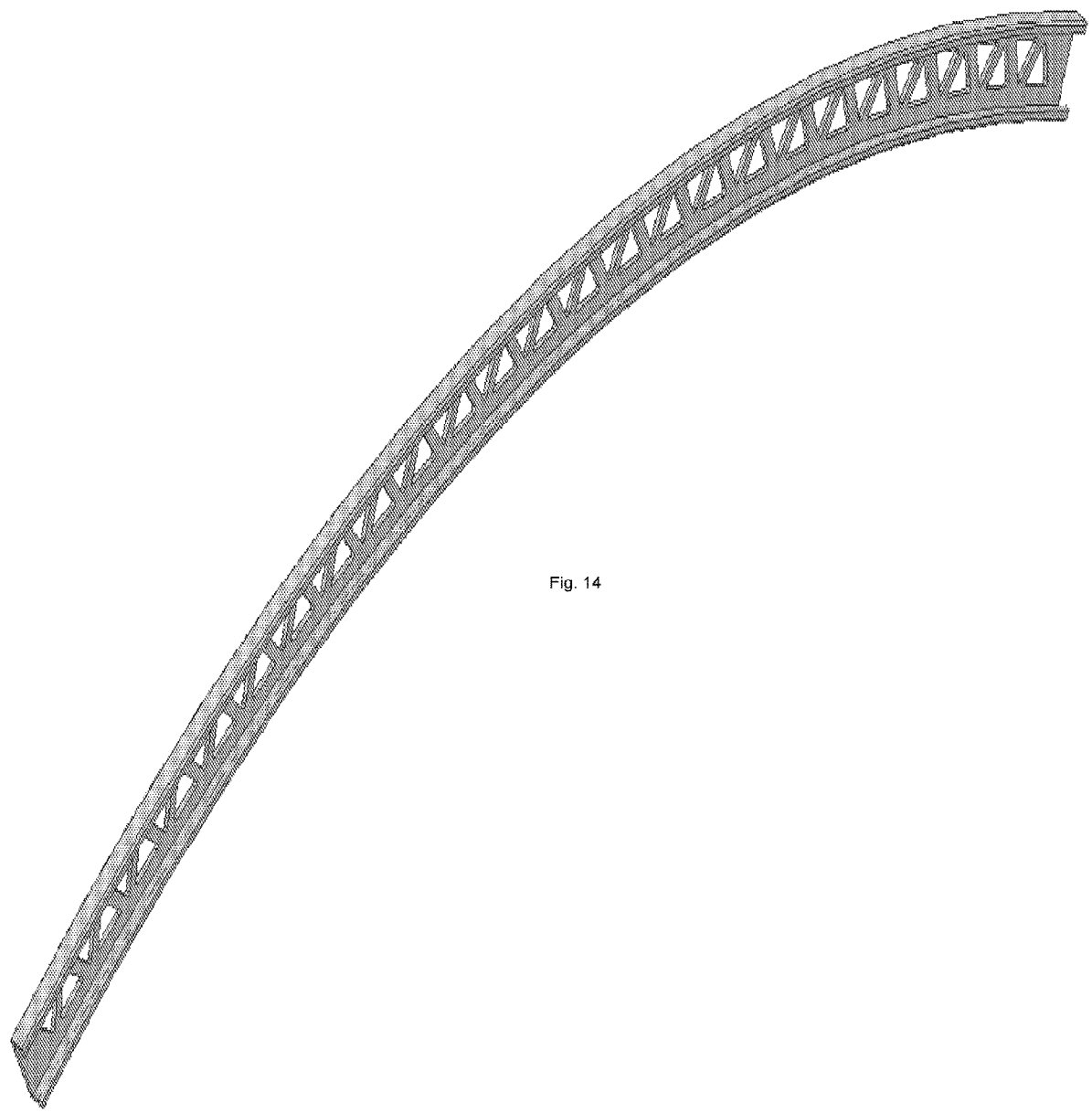
FIG. 14 is a rail component of the present invention.
Figure 15:
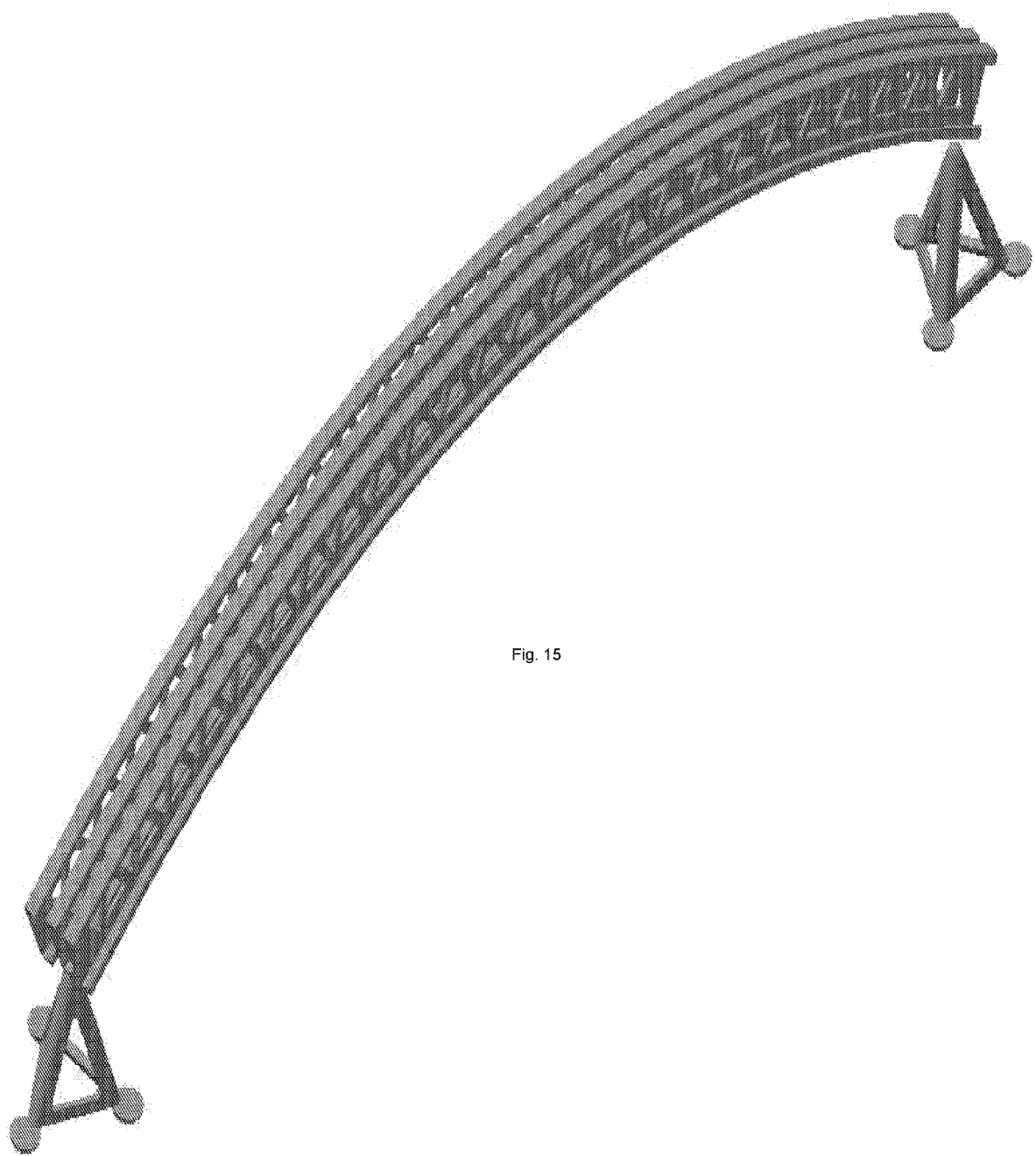
FIG. 15 is an oblique view of the present invention in a stowed configuration.
Figure 16:
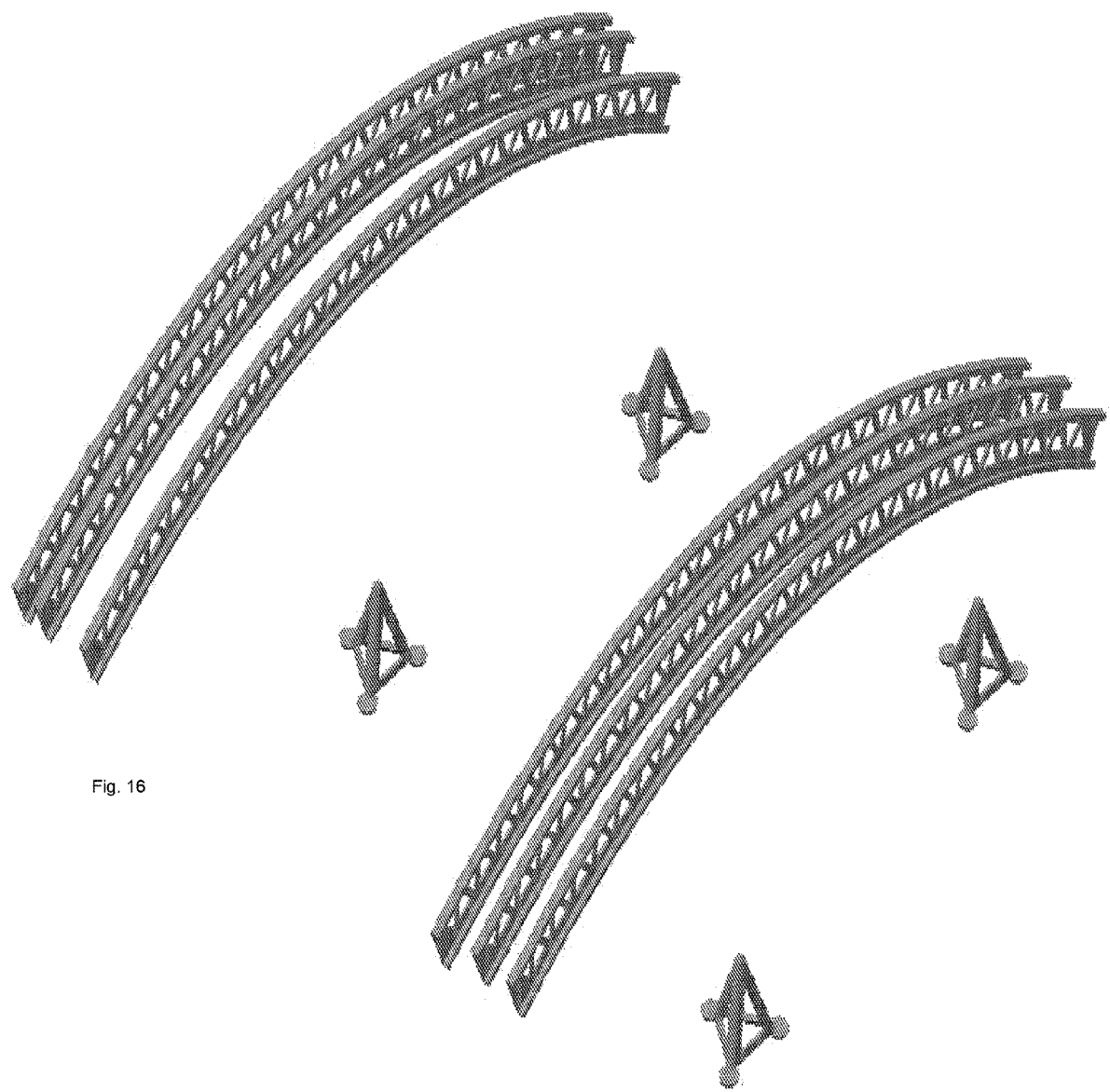
FIG. 16 is an oblique exploded view of an embodiment of the present invention.
Figure 17:
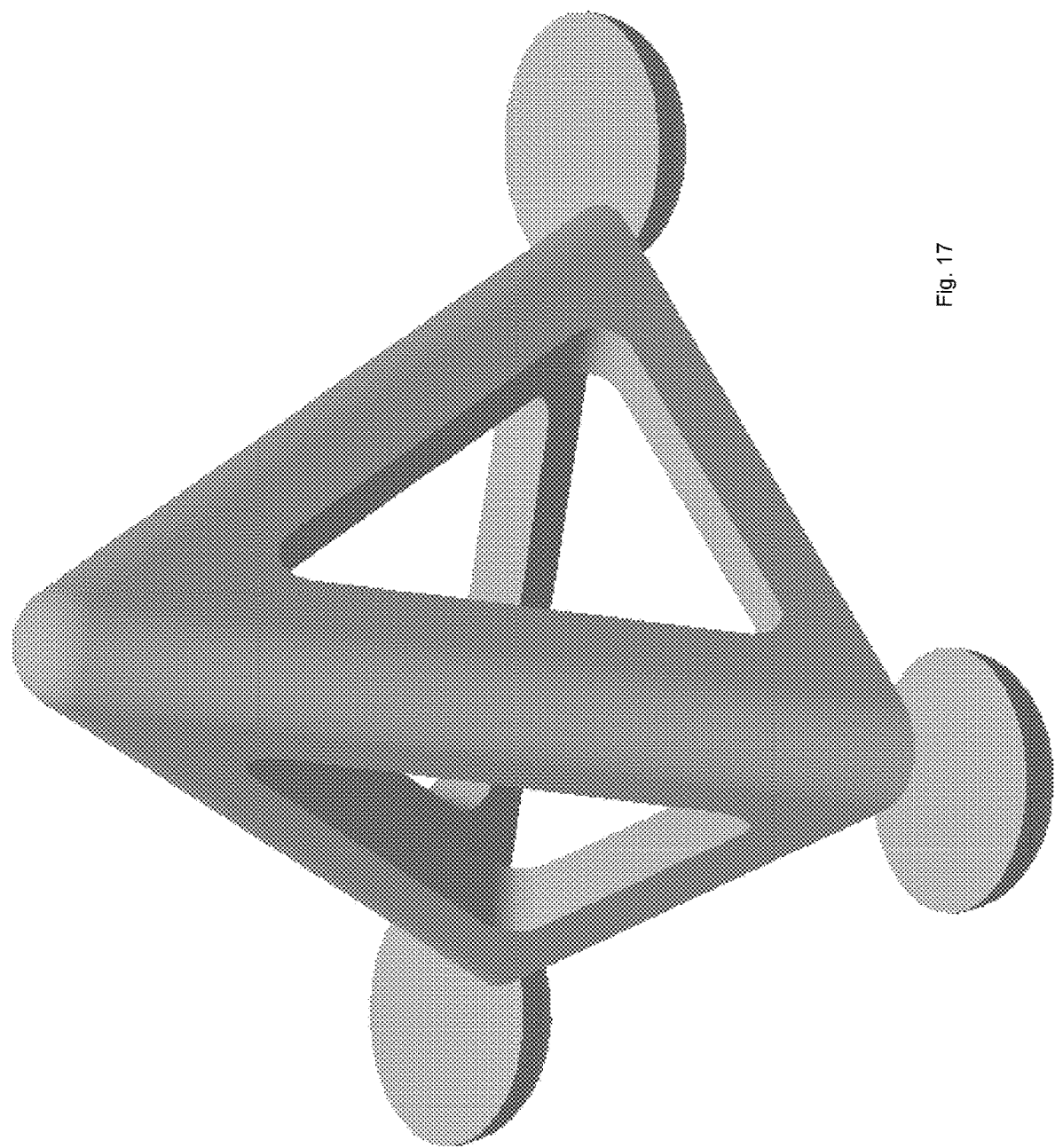
FIG. 17 is an embodiment of a tower component of the present invention.

FIG. 13 shows an embodiment of the inventive rack of FIG. 11 mounted on the roof of an SUV, with the rack in a stowed configuration. FIG. 14 shows one of the individual rail components of the rack of FIG. 13 in isolation. FIG. 15 shows one of the rail assemblies of the rack shown in FIG. 11. FIG. 15 shows clearly the three rail components in an adjacent and coterminous configuration, as can be configured in a stowed configuration during, for example, vehicle movement. FIG. 16 shows an exploded view of the inventive rack embodiment of FIG. 11. FIG. 16 shows the three rail components of each rail assembly, which rail components can lock together and slide relative to each other to extend in embodiments of the inventive rack. FIG. 16 also shows four towers that can be used in some embodiments to locate the rack rail assemblies onto a roof of a vehicle in a safe and secure manner using securing means as are known in the art. FIG. 17 shows an individual tower close up. Towers can be conventional rack towers as are known in the art, and can be created from stampings, castings, forgings, or other manufacturing processes.

Embodiments of the present invention use arced or "bowed" rails that inherently support heavier load and resist deflection. The disclosed and claimed invention naturally glides the loading area down adjacent to vehicle and present a comfortable loading angle, allowing access to entire load area. Simple design with very few moving parts, parts glide relative to each other only on PTFE bushings in some embodiments. Other embodiments can incorporate other types of known interfaces between the rail assembly components to provide predictable and controlled movement relative to each other while deploying.

The invention claimed is:

1. A vehicle roof rack system fixed on a vehicle comprising:
   a rail assembly configured to be mounted in an orientation transverse to the axis described by the primary direction of travel of the vehicle;
   wherein the rail assembly comprises a first rail system and a second rail system that are arranged in parallel to each other and curved along their longest axes;
   a travel limiter; and
   wherein the first rail system and the second rail system comprise tubes of differing outer and inner diameters with respect to the other tubes to allow the tubes to translate within and/or outside of each other.

2. The system of claim 1, further comprising a tower.

3. The system of claim 1, further comprising a stabilizer connected to the first rail system and the second rail system.

4. The system of claim 1, further comprising a cargo mounting adaptor.

5. The system of claim 1, wherein the travel limiter is adjustable.

6. The system of claim 5, wherein the travel limited is lockable.

7. The system of claim 1, wherein the first rail system has non-marring bumpers.

8. The system of claim 1, further comprising a lift assister.

9. The system of claim 1, wherein the first rail system has an outer tube, a middle tube, and an inner tube.

10. A vehicle roof rack system fixed on a vehicle comprising:
a rail assembly configured to be mounted in an orientation transverse to the axis described by the primary direction of travel of the vehicle;
wherein the rail assembly comprises a first rail system and a second rail system that are arranged in parallel to each other and curved along their longest axes;
wherein the first rail system and the second rail system extend from a roof of the vehicle to a side of the vehicle below a vehicle window level; and
wherein the first rail system and the second rail system comprise tubes of differing outer and inner diameters with respect to the other tubes to allow the tubes to translate within and/or outside of each other.

11. The system of claim 10, further comprising a tower.

12. The system of claim 10, further comprising a stabilizer connected to the first rail system and the second rail system.

13. The system of claim 10, further comprising a cargo mounting adaptor.

14. The system of claim 10, wherein the first rail system and the second rail system have a fully collapsed length and a fully extended length, and wherein the fully extended length is over 300% longer than the fully collapsed length.

15. The system of claim 10, further comprising a travel limiter being adjustable and lockable.

16. The system of claim 10, wherein the first rail system has non-marring bumpers.

17. The system of claim 10, further comprising a lift assister.

18. The system of claim 10, wherein the first rail system has an outer tube, a middle tube, and an inner tube.

19. The system of claim 10, wherein the first rail system has a cross sectional shape selected from the group consisting of rectilinear, triangular, oval, round, and polygonal.

20. A vehicle roof rack system fixed on a vehicle comprising:
a rail assembly configured to be mounted in an orientation transverse to the axis described by the primary direction of travel of the vehicle;
wherein the rail assembly comprises two rail systems that are arranged in parallel to each other and curved along their longest axes;
a tower;
a stabilizer connected to the two rail systems; and
wherein the two rail systems each have three tubes of differing outer and inner diameters with respect to the other tubes to allow the tubes to translate within and/or outside of each other.

* * * * *